United States Patent
Heiser et al.

(10) Patent No.: US 12,491,897 B2
(45) Date of Patent: Dec. 9, 2025

(54) INDEXING SENSOR DATA ABOUT THE PHYSICAL WORLD

(71) Applicant: Woven by Toyota, U.S., Inc., Palo Alto, CA (US)

(72) Inventors: Christopher Heiser, Campbell, CA (US); Anand Ramesh, Campbell, CA (US); Khalid Azam, Campbell, CA (US); Trilok Agarwal, Campbell, CA (US); Harry Chan-Maestas, Campbell, CA (US); Stefan Gloutnikov, Campbell, CA (US); Kevin Phillips, Campbell, CA (US)

(73) Assignee: WOVEN BY TOYOTA, U.S., INC., Palo Alto, CA (US)

( * ) Notice: Subject to any disclaimer, the term of this patent is extended or adjusted under 35 U.S.C. 154(b) by 156 days.

(21) Appl. No.: 18/284,664

(22) PCT Filed: Apr. 4, 2022

(86) PCT No.: PCT/US2022/023265
§ 371 (c)(1),
(2) Date: Sep. 28, 2023

(87) PCT Pub. No.: WO2022/212939
PCT Pub. Date: Oct. 6, 2022

(65) Prior Publication Data
US 2024/0174244 A1    May 30, 2024

Related U.S. Application Data

(60) Provisional application No. 63/170,291, filed on Apr. 2, 2021.

(51) Int. Cl.
*B60W 50/06*        (2006.01)
*B60W 60/00*        (2020.01)
(Continued)

(52) U.S. Cl.
CPC ............. *B60W 50/06* (2013.01); *G06V 20/58* (2022.01); *B60W 60/00* (2020.02);
(Continued)

(58) Field of Classification Search
CPC .. B60W 50/06; B60W 60/00; B60W 2556/45; G06V 20/58; G06V 10/80;
(Continued)

(56) References Cited

U.S. PATENT DOCUMENTS

2012/0112694 A1*    5/2012    Frisch ..................... B60L 53/11
                                                                320/109
2019/0373521 A1    12/2019    Crawford
(Continued)

FOREIGN PATENT DOCUMENTS

CN        112017431 A        12/2020
KR        10-1830544 B1        2/2018
(Continued)

OTHER PUBLICATIONS

International Search Report and Written Opinion of the International Searching Authority issued in corresponding International Patent Application No. PCT/US2022/023265, dated Jul. 19, 2022, 11 pages.

*Primary Examiner* — Ig T An
(74) *Attorney, Agent, or Firm* — Christopher G. Darrow; Darrow Mustafa PC

(57) ABSTRACT

Systems, methods, and other embodiments described herein relate to improving the use of sensor data in a mobile context by indexing the sensor data with derived content. In one embodiment, a method includes, responsive to an offload event, acquiring sensor data from a vehicle. The method includes generating an index of the sensor data according to attributes of how the sensor data was acquired. The method includes analyzing the sensor data to derive additional
(Continued)

content using at least a model. The method includes updating the index using the additional content to further indicate characteristics of the sensor data relative to the attributes. The method includes providing the index to a remote device as a report about contents of the sensor data.

20 Claims, 4 Drawing Sheets

(51) Int. Cl.
*G01S 7/00* (2006.01)
*G06V 10/80* (2022.01)
*G06V 20/58* (2022.01)

(52) U.S. Cl.
CPC .......... *B60W 2556/45* (2020.02); *G01S 7/003* (2013.01); *G06V 10/803* (2022.01)

(58) Field of Classification Search
CPC ....... G06V 20/56; H04W 4/38; G01S 13/865; G01S 13/867; G01S 13/89; G01S 15/89; G01S 15/931; G01S 17/89; G01S 17/931
See application file for complete search history.

(56) References Cited

U.S. PATENT DOCUMENTS

| | | | |
|---|---|---|---|
| 2020/0077240 A1 | 3/2020 | Bansal et al. | |
| 2020/0137351 A1* | 4/2020 | Bai | H04N 7/12 |
| 2021/0014323 A1* | 1/2021 | Hayes | H04L 45/24 |
| 2022/0117215 A1* | 4/2022 | Sibley | A01M 21/00 |

FOREIGN PATENT DOCUMENTS

| | | |
|---|---|---|
| KR | 10-2018-0097247 A | 8/2018 |
| WO | 2008-085650 A2 | 7/2008 |

\* cited by examiner

INDEXING SENSOR DATA ABOUT THE PHYSICAL WORLD

CROSS-REFERENCE TO RELATED APPLICATIONS

This application is a U.S. National Stage Non-Provisional Application claiming priority to PCT/US2022/023265, filed Apr. 4, 2022, which claims the benefit of U.S. Provisional Application No. 63/170,291, filed Apr. 2, 2021, which are herein incorporated by reference in their entirety

TECHNICAL FIELD

The subject matter described herein relates, in general, to improving the indexing of sensor data and, more particularly, to indexing the sensor data and using the index to represent the sensor data in place of offloading the sensor data itself.

BACKGROUND

Modern vehicles produce exceptional amounts of data. Available means of communication and storage generally encounter difficulties when handling such massive amounts of data. That is, for example, available communication pathways, such as cellular networks, represent significant bottlenecks when offloading the sensor data from the vehicle, and while cloud-based systems could potentially handle the large amounts of raw data, communication and storage costs are significant when considering the amount that each separate vehicle generates, thereby causing difficulties when attempting to offload the sensor data.

The communication and storage problem is only exacerbated as more and more data collection systems come online in the form of computerized vehicles, smart systems, and internet-of-things devices. The massive amount of data and the asymmetrical design of existing networking systems mean that in addition to the difficulties with offloading the sensor data, central data systems would be burdened with significant storage and processing loads that are generally undesirable.

SUMMARY

In various embodiments, example systems and methods relate to a manner of improving sensor data offloading in a mobile context by indexing the sensor data with derived content and aggregating indexes from various sources to form a combined catalog of sensor data. As previously noted, a vehicle that is equipped with various sensors for automated driving and/or other purposes generates a large amount of sensor data. The sensor data includes valuable information about the physical world that is depicted therein. However, offloading the sensor data from the vehicle and providing the sensor data in a way that is useful represents significant difficulties because of the quantities of information and limitations on communication pathways and computing resources.

Therefore, in one or more embodiments, an inventive system is disclosed that improves the offloading and processing of the sensor data by utilizing capabilities of edge-based devices to perform the offloading and processing, thereby avoiding communication bottlenecks and extensive use of computing resources in the cloud. For example, in one approach, the system is integrated with a charging station or is otherwise associated with an edge-based device at a location where the vehicle may park for extended periods of time (e.g., a home, office, parking garage. Etc.). Whichever location is utilized, the system is generally integrated with an edge-based device that has the ability to store and process the sensor data and to do so for at least a single vehicle. Accordingly, the system offloads and locally stores the raw sensor data from the vehicle. Then, the system can execute various applications, such as machine learning models, analytics, and so on, over the sensor data to derive additional content. The additional content can take various forms and is not generally limited but may include machine perceptions (e.g., object identification, scene recognition/correlation, and so on).

Moreover, the system may also receive the raw sensor data derivations generated by the vehicle itself as part of, for example, processing of the sensor data on the vehicle associated with an original use. Thus, the raw sensor data from the vehicle, in various arrangements, includes annotations and/or other layers of metadata that further characterize contents of the sensor data. In any case, the system indexes the sensor data according to attributes of the sensor data itself and the derived content from both the vehicle and the system. The system uses the attributes, which are generally time and location information indicating when and where respective segments of the sensor data have been acquired, to index the sensor data. The system can then further update the index using the derived content by correlating the time location information with annotations about the derived content. Thereafter, the system provides the index, including information about the sensor data to a cloud-based device. The cloud-based device functions to aggregate indexes from vehicles within the same and different geographic locations, thereby generating a catalog (i.e., an aggregated/combined index) of collected sensor data from a broad selection of vehicles. This provides a central resource for querying about different aspects of the sensor data that can serve as an entry point to identify interesting data and then retrieving the data directly from an edge device when needed. Accordingly, the system facilitates use of the sensor data for many different purposes while avoiding difficulties associated with uploading and processing the sensor data in the cloud. In this way, the system improves the use of the sensor data by providing an index about observed areas of the physical world, thereby simplifying storage and use of the information.

In one embodiment, a collection system for improving offloading and storage of sensor data is disclosed. The collection system includes one or more processors and a memory communicably coupled to the one or more processors. The memory stores instructions that, when executed by the one or more processors, cause the one or more processors to, responsive to an offload event, acquire sensor data from a vehicle. The instructions include instructions to generate an index of the sensor data according to attributes of how the sensor data was acquired. The instructions include instructions to analyze the sensor data to derive additional content using at least a model and update the index using the additional content to further indicate characteristics of the sensor data relative to the attributes. The instructions include instructions to provide the index to a remote device as a report about contents of the sensor data.

In one embodiment, a non-transitory computer-readable medium for improving offloading and storage of sensor data and including instructions that, when executed by one or more processors, cause the one or more processors to perform one or more functions is disclosed. The instructions include instructions to, responsive to an offload event, acquire sensor data from a vehicle. The instructions including instructions to generate an index of the sensor data according to attributes of how the sensor data was acquired and to analyze the sensor data to derive additional content using at least a model. The instructions including instructions to update the index using the additional content to further indicate characteristics of the sensor data relative to the attributes. The instructions including instructions to provide the index to a remote device as a report about contents of the sensor data.

In one embodiment, a method is disclosed. In one embodiment, the method includes, responsive to an offload event, acquiring sensor data from a vehicle. The method includes generating an index of the sensor data according to attributes of how the sensor data was acquired. The method includes analyzing the sensor data to derive additional content using at least a model. The method includes updating the index using the additional content to further indicate characteristics of the sensor data relative to the attributes. The method includes providing the index to a remote device as a report about contents of the sensor data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
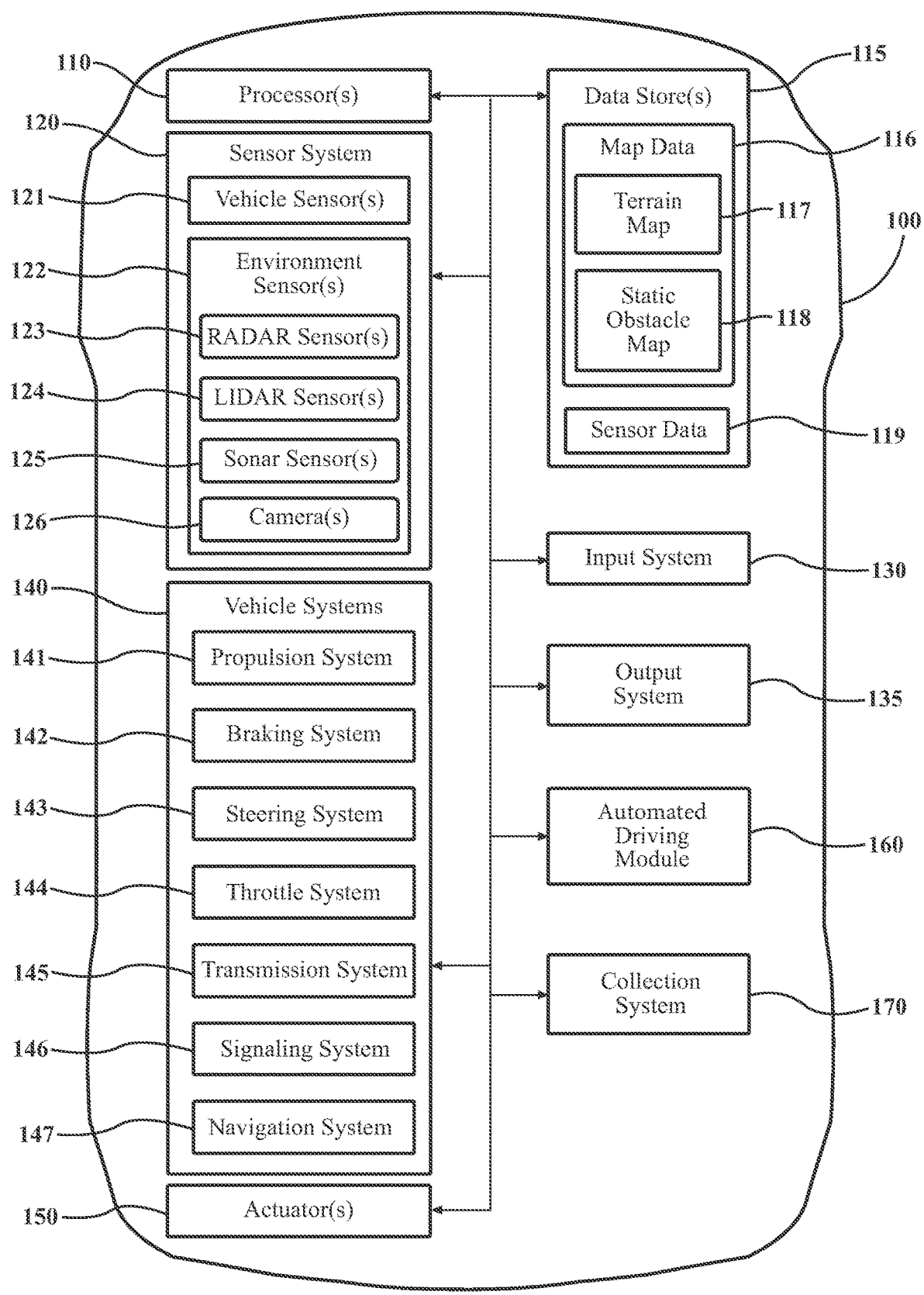
FIG. 1 illustrates one embodiment of a vehicle within which systems and methods disclosed herein may be implemented.

Systems, methods, and other embodiments are disclosed that are associated with a manner of improving sensor data offloading in a mobile context by indexing the sensor data with derived content and aggregating indexes from various sources to form a combined catalog of sensor data. As previously noted, a vehicle that is equipped with various sensors for automated driving and/or other purposes generates a large amount of sensor data. In some examples, such vehicles can generate 5 TB/hr of sensor data. The sensor data includes valuable information about the physical world that is depicted therein. However, offloading the sensor data from the vehicle and providing the sensor data in an ingestible form represents significant difficulties because of limitations on communication pathways and computing resources.

Therefore, in one or more embodiments, a collection system is disclosed that improves the offloading and processing of the sensor data by utilizing the capabilities of edge-based devices to perform the offloading and processing. Using the edge devices that are close to the source avoids communication bottlenecks since direct physical connections or robust wireless connections are more feasible. Additionally, the edge devices can focus computing resources on a smaller set of data associated with a set of vehicles that offload to the device, thereby avoiding extensive use of computing resources in the cloud.

For example, in one approach, the system is integrated with a charging station or is otherwise associated with an edge-based device at a location where the vehicle may park for extended periods of time (e.g., a home, office, parking garage. Etc.). Whichever location is utilized, the system is generally integrated with an edge-based device that has the ability to store and process the sensor data and do so for at least a single vehicle. Accordingly, the system offloads and locally stores the raw sensor data from the vehicle. Then, the system can execute various applications, such as machine learning models, analytics, and so on, over the sensor data to derive additional content. The additional content can take various forms and is not generally limited, but may include machine perceptions (e.g., object identification, scene recognition/correlation, and so on), and other information derived from the sensor data.

Moreover, the system may also receive derivations with the raw sensor data generated by the vehicle itself. That is, the vehicle may originally generate the sensor data and process the sensor data to, for example, perceive aspects of the surrounding environment. These perceptions may take different forms, such as object instance identification, semantic segmentation of a perceived scene, trajectory estimation, and so on. Accordingly, the vehicle can provide these derivations along with the sensor data to further enrich the sensor data and avoid redundant processing for the same determinations. The vehicle may then include, in various arrangements, annotations and/or other layers of metadata along with the sensor data that further characterize the contents of the sensor data.

Once offloaded from the vehicle, the system indexes the sensor data according to attributes of the sensor data itself and the derived content generated from both the vehicle and the collection system. The collection system uses the attributes, which are generally time and location information indicating when and where respective segments of the sensor data have been acquired, to originally index the sensor data. The system can then further update the index using the derived content by correlating the time location information with annotations about the derived content. Thereafter, the system provides the index, including information about the sensor data, but not the sensor data itself, to a cloud-based device. The cloud-based device functions to aggregate indexes from vehicles within the same and different geographic locations, thereby generating a catalog (i.e., an aggregated/combined index) of collected sensor data from a broad selection of vehicles. This provides a central resource for querying about different aspects of the sensor data that can serve as an entry point to identify interesting data and then retrieve the data directly from an edge device when needed. Accordingly, the system facilitates the use of the sensor data for many different purposes while avoiding difficulties associated with uploading and processing the sensor data in the cloud. In this way, the system improves the use of the sensor data to provide an index about observed areas of the physical world.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles and edge devices, it will be understood that embodiments are not limited to these devices. In some implementations, a collection system 170 may be implemented within any device that, for example, collects sensor data about the physical world. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100, in at least one arrangement, is a connected vehicle that is capable of communicating wirelessly with other devices, such as other connected vehicles, infrastructure elements (e.g., roadside units, edge devices, etc.), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed collection system 170 can be implemented within the vehicle 100, while further components of the collection system 170 are implemented within edge-based devices, as discussed further subsequently.

Some of the possible elements of the vehicle 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a collection system 170 that is implemented to perform methods and other functions as disclosed herein relating to collecting, processing, and indexing of sensor data collected by the vehicle 100. As previously noted, while the collection system 170 is shown as being a component of the vehicle 100, the present disclosure envisions the collection system 170 as being implemented as separate distinct instances within different devices, including but not limited to edge devices, such as micro-datacenters, RSUs, charging stations, etc. In general, such devices may be located anywhere that a vehicle parks for an extended period.

Thus, these devices may be located at homes, offices, integrated with charging stations, within parking garages, and so on. In general, the collection system 170 associated with an edge device that is at a static location is, for example, configured with additional storage to handle large quantities of data while also providing further resources in the form of processing resources to execute applications over offloaded sensor data and generate additional derived content.

Moreover, the collection system 170, as provided for within the vehicle 100, functions in cooperation with a communication system. In one embodiment, the communication system communicates according to one or more communication standards. For example, the communication system can include multiple different antennas/transceivers and/or other hardware elements for communicating at different frequencies and according to respective protocols whether wired or wireless. The communication system, in one arrangement, communicates via a communication protocol, such as a WiFi, DSRC, V2I, V2V, or another suitable protocol for communicating between the vehicle 100 and other entities, such as an edge device. Moreover, the communication system, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices. In any case, the collection system 170 can leverage various communication technologies to provide communications to other entities and/or received information from other entities.

Figure 2:
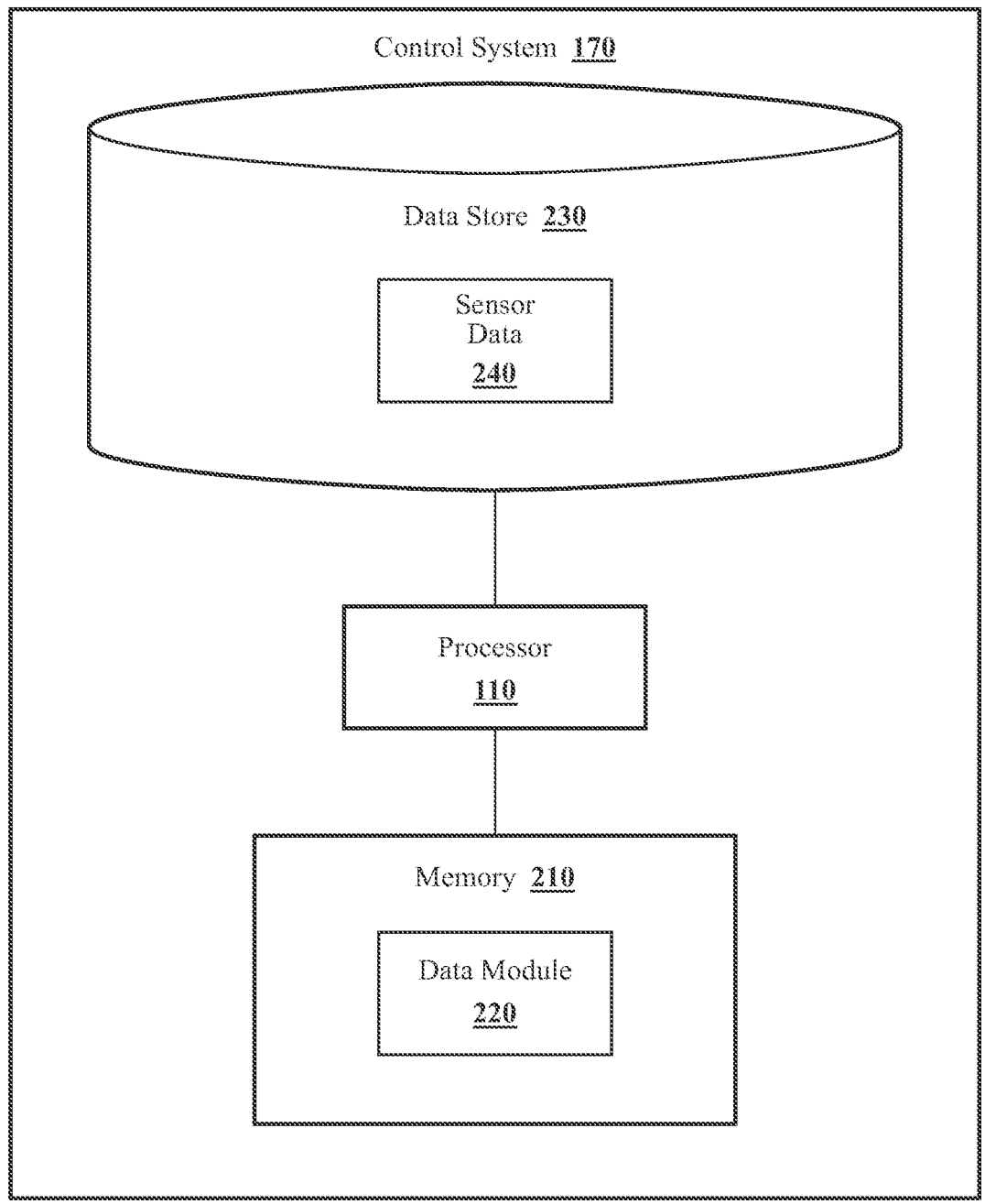
FIG. 2 illustrates one embodiment of a collection system associated with improving the indexing of sensor data.

With reference to FIG. 2, one embodiment of the collection system 170 is further illustrated. The collection system 170 is shown as including a processor 110 from the vehicle 100 of FIG. 1. Accordingly, the processor 110 may be a part of the collection system 170, the collection system 170 may include a separate processor from the processor 110 of the vehicle 100 or the collection system 170 may access the processor 110 through a data bus or another communication path. In further aspects, the processor 110 is a cloud-based resource. Thus, the processor 110 may communicate with the collection system 170 through a communication network or may be co-located with the collection system 170. In one embodiment, the collection system 170 includes a memory 210 that stores a data module 220. The memory 210 is a random-access memory (RAM), read-only memory (ROM), a hard-disk drive, a flash memory, or other suitable memory (either volatile or non-volatile) for storing the module 220 and/or other information used by the collection system 170. The module 220 is, for example, computer-readable instructions within the physical memory 210 that, when executed by the processor 110, cause the processor 110 to perform the various functions disclosed herein.

Continuing with FIG. 2 and a general embodiment of the collection system 170, in one or more arrangements, the collection system 170 includes a data store 230. The data store 230 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes the sensor data 240 along with other information that is used by the module 220. It should be appreciated that while the data store 230 is shown as including the sensor data 240 separate instances of the collection system 170 may implement the data store 230 to include additional sets of information, such as metadata associated with the sensor data 240, including derived content from automated systems of the vehicle 100 and/or derived content from applications executed by the processor 110 when implemented at an edge device.

In any case, the data module 220 includes instructions that function to control the processor 110 to acquire the sensor data 240 about a surrounding environment of the vehicle 100 when implemented as part of the vehicle 100. The collection system 170 captures observations of the surrounding environment in the form of the sensor data 240 that the vehicle 100 (e.g., via autonomous driving module 160) processes into determinations about the surrounding environment, including identification of objects and aspects of the environment (e.g., vehicles, pedestrians, roadways, lane configurations), trajectories of objects, operating states of traffic signals and traffic associated with the roadways, semantic classes of identified aspects, and so on. In general, the collection system 170 within the vehicle 100 may acquire any information generated by the vehicle 100 as being complementary to the sensor data 240. Thus, the sensor data 240 is not limited to including only observations from cameras, LiDAR, radar, and similar sensors about the surrounding environment but can also include general telematics data about the operation of the vehicle 100. For example, the sensor data 240 can include dynamics information about the vehicle 100 (e.g., pitch, yaw, roll, speed, etc.), engine data, driver control inputs (e.g., steering angle, accelerator percent, etc.), and so on. In yet a further aspect, the sensor data 240 includes information about the interior passenger cabin of the vehicle 100, such as camera images, locations of passengers, infotainment settings/use, and so on. This information is accompanied by general metadata that includes a timestamp along with geographic information specifying a location of the vehicle 100 when the sensor data 240 was collected.

The data module 220, in one arrangement, controls respective sensors of the vehicle 100 to provide the data inputs in the form of the sensor data 240. The data module 220 may further process the sensor data 240 into separate observations of the surrounding environment. For example, the data module 220, in one approach, fuses data from separate sensors to provide an observation about a particular aspect of the surrounding environment. By way of example, the sensor data 240 itself, in one or more approaches, may take the form of separate images, radar returns, LiDAR returns, and so on. The data module 220 may derive determinations (e.g., location, pose, characteristics, etc.) from the sensor data 240 and fuse the data for separately identified aspects of the surrounding environment, such as surrounding vehicles, pedestrians, and so on. The data module 220 may further extrapolate the sensor data 240 into an observation by, for example, correlating the separate instances of sensor data into a meaningful observation about an object beyond an instantaneous data point. For example, the data module 220 may track a pedestrian over many data points to provide an indication of actions in relation to various objects, such as a vehicle, a shopping cart, etc. to provide information about whether an object is moving or performing some specific action (e.g., parking in a parking space).

Additionally, while the data module 220 is discussed as controlling the various sensors to provide the sensor data 240, in one or more embodiments, the module 220 can employ other techniques that are either active or passive to acquire the sensor data 240. For example, the data module 220 may passively sniff the sensor data 240 from a stream of electronic information provided by the various sensors or other modules/systems in the vehicle 100 to further components within the vehicle 100. Moreover, as noted, the data module 220 or other components of the vehicle 100 (e.g., module 160) can undertake various approaches to fuse data from multiple sensors when providing the sensor data 240. Thus, the sensor data 240, in one embodiment, represents a combination of perceptions acquired from multiple sensors.

Of course, depending on the sensors that the vehicle 100 includes, the available sensor data 240 that the collection system 170 can harvest may vary. As one example, according to a particular implementation, the vehicle 100 may include different types of cameras or placements of multiple cameras. When acquiring the sensor data 240, the data module 220 may acquire various electronic inputs that originate from the vehicle 100, which may be stored in the data store 230 of the collection system 170 as the sensor data 240 and processed according to various algorithms, such as machine learning algorithms, heuristics, and so on by one or more additional systems of the vehicle 100. Accordingly, the collection system 170, in one approach, maintains the sensor data 240 along with information derived therefrom in the data store 230.

As previously noted, this information can be significant in quantity. Accordingly, in further arrangements, the data module 220 may store the sensor data 240 for a limited time (e.g., according to available space and first-in first-out). In yet further aspects, the data module 220 may down-sample or selectively store information, such as by skipping video frames, LiDAR frames, and so on. In any case, the collection system 170 store a plurality of information acquired by the vehicle 100 and further offloads the information when a suitable connection with an edge device is available.

Figure 3:
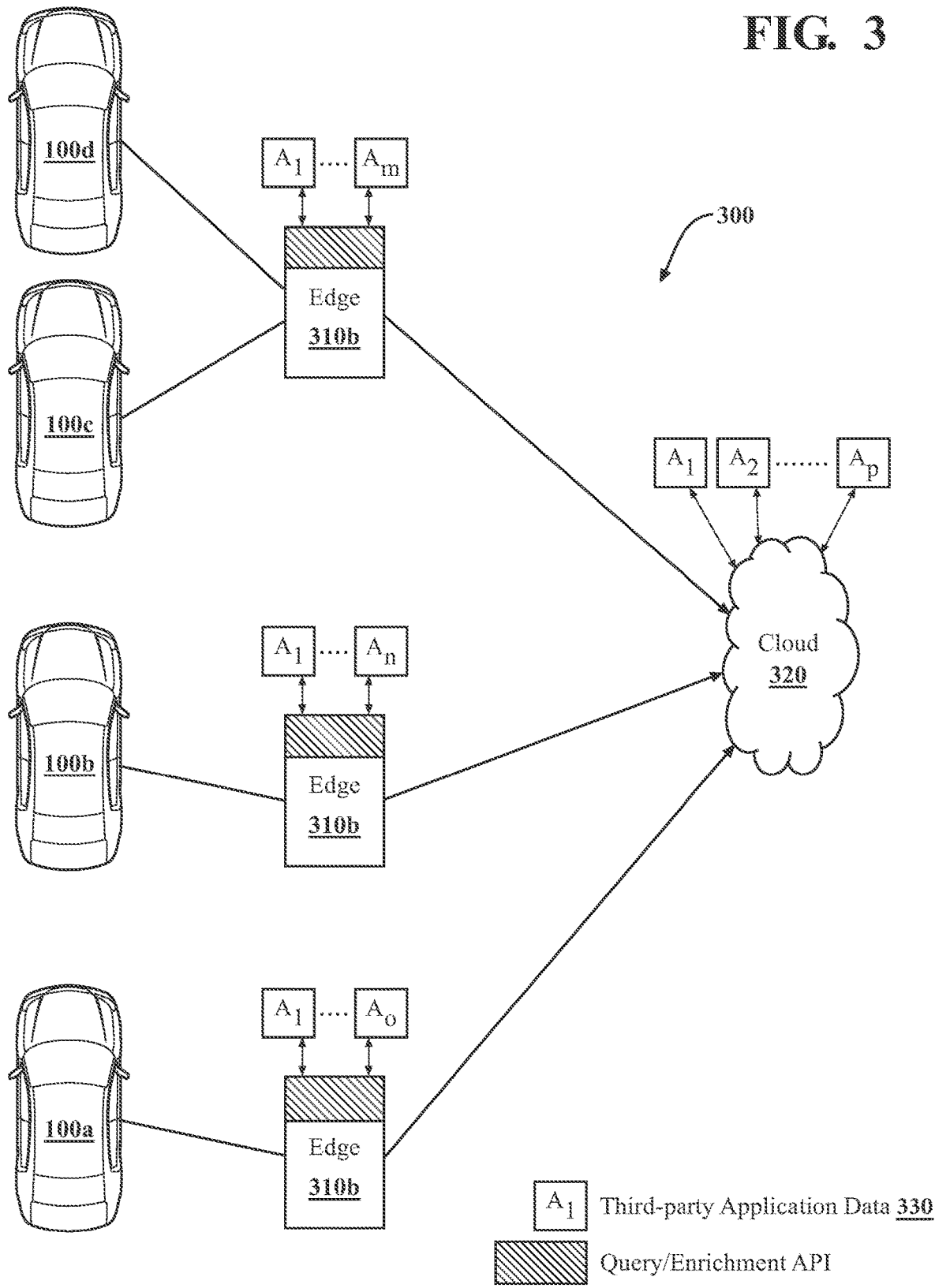
FIG. 3 illustrates a diagram of a network including various components that implement the systems and methods discussed herein.

As a further explanation of the overall architecture of the current approach consider FIG. 3. FIG. 3 shows a network architecture 300 of various devices. In particular, the network architecture 300 shows relationships between vehicles 100a-d, edge 310a-c, and a cloud 320. The vehicles 100a-d are representative of devices that acquire sensor data to be collected at the edges 310a-c, which are edge devices. As previously noted, the vehicles 100a-d may include devices other than vehicles, such as drones, robots, and other devices that collect information about the physical world that may be useful for subsequent analysis and querying. Further, the separate edges 310a-c may be associated with different fleets of vehicles. In any case, the collection system 170 is separately embedded as unique instances with the edges 310a-c to collect information from the vehicles 100a-d and provide indexes of the collected data to the cloud 320 where the indexes are aggregated into a catalog of available data about the physical world as encountered and perceived by the vehicles 100a-d. In this way, To offload the sensor data 240 to a collection system 170 of an edge device, the vehicle 100 and the collection system 170 of the edge device establish a connection after the detection of an offload event. In general, the offload event is an occurrence of a condition that indicates the presence of the vehicle 100 at the edge device and the data on the vehicle 100 that is to be offloaded. Thus, as one example, the vehicle 100, which may be an electric vehicle, physically connects with a charging station, which may further include a data connection. Upon sensing the establishment of the connection, the collection system 170 of the charging station may, for example, query the collection system of the vehicle 100 about whether data is present to be offloaded. In general, the particular protocol may vary but the vehicle 100 and the edge device function to establish a connection and determine that data is to be uploaded as the offload event. Accordingly, when this occurs the collection system 170 of the edge device determines that the condition for the offload event is satisfied and proceeds to acquire the sensor data 230 from the vehicle 100.

Once the collection system 170 of the edge device acquires the sensor data 240, the data module 220 indexes the sensor data 240 according to attributes of the sensor data 240. In one arrangement, the attributes include time and location associated with respective segments of the sensor data 240. Additionally, it should be appreciated that the vehicle 100 can offload metadata and derivations about the sensor data 240 generated by the vehicle 100 in addition to the sensor data 240 itself. That is, while the sensor data 240 is discussed as being offloading, the sensor data 240 can further include the information derived by the module 160, telematics data, and other information accumulated by the vehicle 100. In any case, indexing the sensor data 240, in this way, serves as a baseline index of the sensor data 240 in order to provide a general entry point according to the attributes into the sensor data 240 itself. Once the sensor data 240 is uploaded to the collection system 170, the data module 220 further processes the sensor data 240 to derive added content.

With reference to FIG. 3, the edge devices 310*a-c* are shown with various third-party applications 330. The applications 330 may interact with the sensor data 240 via various application programming interfaces (APIs) that are, in one arrangement, integrated as part of the data module 220 to facilitate analysis of the sensor data 240. In any case, the applications 330 can generally include a wide variety of models, heuristics, or other mechanisms for analyzing the sensor data 240. The separate edges 310*a-c* may include any number of the applications 330, which may vary at the respective edge devices according to applications associated with particular geographic locations or use cases for the vehicles that interact with a respective edge device. As one example, the applications 330 can include machine learning models, statistical analysis applications, and so on. The applications 330 function to process the sensor data 240 and provide derived added content, such as machine perception, pattern recognition, and so on. Accordingly, the applications 330 output the derived added content as an additional layer of the sensor data 240.

The data module 220 can then update the index according to the derived added content in order to further enrich the index with information about the sensor data 240. This added information can be included as simple tags, annotations, or other indicators that are generally relatively small compared to the sensor data 240 represented by the information. Accordingly, the resulting index provides information about the sensor data 240 correlated by time and location. This information is provided in place of the sensor data 240 itself, thereby avoiding bottlenecks with communicating large quantities of information while permitting querying of the data. This subsequent querying provides for retrieval of the sensor data 240 from the edge devices so that entities can identify segments of the data that is of interest and retrieve only the segments for further analysis or general use. In this way, the collection system 170 improves the storage, indexing, and subsequent use of the sensor data while avoiding difficulties with communication and processing bottlenecks.

Figure 4:
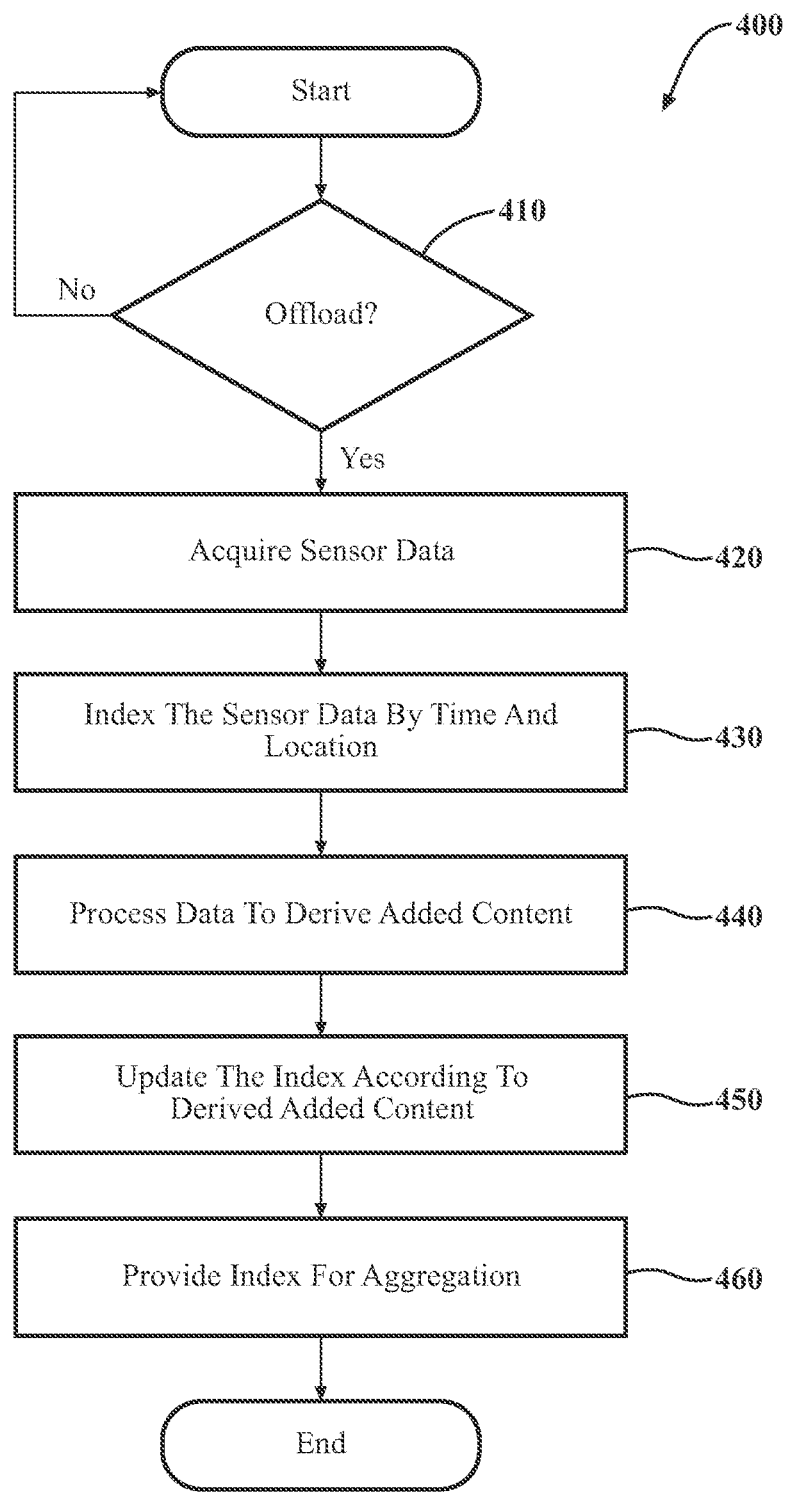
FIG. 4 is a flowchart illustrating one embodiment of a method associated with indexing sensor data at an edge device.

Additional aspects about storing and indexing sensor data at edge devices will be described in relation to FIG. 4. FIG. 4 illustrates a flowchart of a method 400 that is associated with indexing sensor data at an edge device. Method 400 will be discussed from the perspective of the collection system 170 of FIG. 2 as implemented by an edge device. While method 400 is discussed in combination with the collection system 170, it should be appreciated that the method 400 is not limited to being implemented within the collection system 170 but is instead one example of a system that may implement the method 400. Furthermore, while the method is illustrated as a generally serial process, various aspects of the method 400 can execute in parallel to perform the noted functions.

At 410, the data module 220 determines whether an offload event has been satisfied. For example, the data module 220 determines the presence of a vehicle for offloading data by detecting an electronic communication that is in response to a beacon, is part of an electronic handshake, or is otherwise directed to the collection system 170 to indicate the presence of the vehicle for offloading. As previously mentioned, the offload event can include a series of communications that form a handshake or other protocol. This may involve exchanging parameters to negotiate aspects of the offload (e.g., speed, data quantity, etc.). In any case, the offload event generally includes detecting that the vehicle 100 is within proximity of the edge device, establishing a connection for communicating, and then initiating the offload of the sensor data 240.

At 420, the data module 220 acquires the sensor data 240 from the vehicle 100 and stores the sensor data locally at the edge device. The process of acquiring the sensor data 240 includes, in one or more arrangements, receiving the sensor data 240 via a communication pathway, such as via a wired or wireless communication link. The data module 230 receives the sensor data 240 and stores the sensor data 240 locally within the data store 230. As previously noted, the sensor data 240 acquired by the collection system 170 can include the raw data from the sensors and, in various approaches, additional information derived from and about the sensor data 240. That is, the sensor data 240 can be communicated along with metadata describing characteristics of the sensor data 240 itself and additional derived content that is generated by the vehicle 100 from the sensor data 240. In further aspects, data module 220 can selectively sample the sensor data 240 to compress the sensor data 240 for storage. The data module 220 may undertake the compression when the sensor data 240 is initially received or at a subsequent time, such as after further processing as discussed at block 410. In yet further embodiments, the sensor data 240 is stored without compression. In any case, the sensor data 240 is offloaded or otherwise removed from the vehicle 100 and retained at the edge device.

At 430, the data module 220 generates an index of the sensor data 240. In one approach, the data module 230 uses attributes about how the sensor data 240 was acquired to serve as references in the index. The attributes can include different aspects relating to the sensor data 240 but generally include time and geographic location as these aspects generally correlate as the vehicle 100 progresses along a route. Thus, the index makes the sensor data 240 searchable according to time/location. The data module can further populate the index with derived information produced by the vehicle 100. As previously outlined, this information can include information from automated driving systems, telematics data, safety control systems, and so on. Therefore, the initial index functions as a general index over the sensor data 240 to correlate the sensor data 240 with identifying elements so that particular segments of the sensor data 240 can be specifically referenced.

At 440, the data module 220 processes the sensor data 240 to derive added content. In particular, the data module 220 analyzes the sensor data 240 to derive additional content using at least a model or other application. The model/application can be a native integrated application of the collection system 170 or may be a third-party application. That is, the collection system 170 supports access by third-party applications through exposure of an API that facilitates access and processing of the sensor data 240. This permits a diverse set of different applications to process the sensor data 240 and derive additional content thereby providing a richer set of information for subsequent querying. It should be appreciated that the additional content is generally described as derived perceptions of the surrounding environment of the vehicle 100, such as a presence of objects, locations of the objects, types of the objects, and relationships between the objects; however, the additional content may take many different forms including deriving patterns of behaviors (e.g., traffic behaviors, driving behaviors, driver tendencies, etc.), statistical correlations, and so on.

At 450, the data module 220 updates the index using the additional content. Updating the index provides for further indicating characteristics of the sensor data 240 relative to the attributes (i.e., time and location). This further characterization provides additional layers of information for querying in order to identify specific segments of the sensor data 240 that may be relevant to a particular query/request. In general, the data module 220 updates the index by correlating the additional content with the sensor data 240 in the index according to the time and the location of the respective segments associated with the additional content. Moreover, the derived contents may further indicate the characteristics that defines scenarios associated with a combination of objects, locations of the objects, and a roadway context. In general, the scenarios may be specifically derived indicators about the sensor data 240 from the applications further processing the sensor data 240 and/or analysis by one or more applications of the derived content itself to identify patterns within the derived content (e.g., a presence of a pedestrian and another vehicle at an intersection). Similarly, the roadway context may be identified by the applications and can include particular configurations of a roadway in combination with the presence of different objects, weather conditions, and so on. As one example, a roadway context may define a particular type of turn (e.g., left turn) with the presence of traffic, relative speed limits of roads, day/night conditions, and so on. In this way, the data module 220 can embed information into the index without including the sensor data itself to provide a high-resolution as to the contents of the sensor data 240 when searching.

At 460, the data module 220 provides the index to a remote device as a report about contents of the sensor data 240. As noted previously, the remote device is generally a cloud-based resource that aggregates the indexes from many different edge-based devices into a common catalog of all available sensor data among the population of vehicles that are offloading to edge devices. In one or more approaches, the collection system 170 communicates the index to the cloud via a wired or wireless communication link. Communicating the index instead of the sensor data 240 avoids transferring a considerable amount of data and, thereby, avoids bottlenecks associated with a communication link and added costs of bandwidth in transferring the data while still providing information via the index that can be searched to identify aspects of the sensor data that may be of interest. In this way, the collection system 170 improves storage and use of sensor data collected by vehicles that are broadly distributed across geographic areas.

As an additional aspect, the collection system 170 further supports searching of the sensor data via the index. That is, for example, in various implementations a search may be generated at the cloud and executed over the aggregated catalog of indexes. The search may specify particular parameters, such as a date range, a particular geographic location, and specific aspects of the sensor data itself as embodied by the information included within the index. Accordingly, an instance of the collection system 170 executing in the cloud determines from the catalog which edge devices and associated vehicles correspond with the information that matches the search. The cloud can then communicate the search to the specific matching edge devices. At the edge devices, the query is further executed over the local index to identify the segments of information stored thereon. The edge can then communicate the matching sensor data back to the cloud, which may involve communicating the information as a whole or a down-sampled version to conserve bandwidth. Whichever approach is undertaken, the overall system has effectively focused the use of particular segments of data without encountering issues with offloading all of the data to the cloud, thereby improving efficiency.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the collection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the collection system 170, and/or the automated driving module(s) 160 can be in communication to send and/or receive information from the various vehicle systems 140 to control the movement, speed, maneuvering, heading, direction, etc. of the vehicle 100. The processor(s) 110, the collection system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the collection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A collection system for improving offloading and storage of sensor data, comprising:
    one or more processors; and
    a memory communicably coupled to the one or more processors and storing instructions that, when executed by the one or more processors, cause the one or more processors to:
        responsive to an offload event, acquire sensor data from a vehicle at an edge device;
        generate, at the edge device, an index of the sensor data according to attributes of how the sensor data was acquired, including derived perceptions from automated driving systems and safety control systems of the vehicle;
        analyze, at the edge device, the sensor data to derive additional content using at least a model;
        update, at the edge device, the index using the additional content to further indicate characteristics of the sensor data relative to the attributes; and
        provide the index to a remote device as a report about contents of the sensor data.

2. The collection system of claim 1, wherein the instructions to analyze the sensor data include instructions to apply, by the edge device, the model to derive perceptions about a surrounding environment of the vehicle represented by the sensor data including a presence of objects, locations of the objects, types of the objects, and relationships between the objects.

3. The collection system of claim 1, wherein the instructions to generate the index include instructions to correlate the sensor data with the attributes about acquisition of the sensor data including at least a time and a location for when respective segments of the sensor data were acquired.

4. The collection system of claim 3, wherein the instructions to update the index include instructions to correlate the additional content with the sensor data in the index according to the time and the location of the respective segments associated with the additional content, and
    wherein the characteristics include content of the sensor data that defines scenarios associated with a combination of objects, locations of the objects, and a roadway context.

5. The collection system of claim 1, wherein the instructions to provide the index include instructions to communicate the index to a cloud-based device to aggregate the index with indexes from other vehicles in order to form a combined catalog of available sensor data among the vehicle and the other vehicles over a broad geographic area.

6. The collection system of claim 1, wherein the instructions to generate the index according to the attributes include instructions to index the sensor data by at least a geographic location of where the sensor data was acquired and a time of when the sensor data was acquired, and
    wherein the instructions to generate the index include instructions to populate the index with the derived perceptions produced by the vehicle associated with safety systems of the vehicle, and automated control systems of the vehicle.

7. The collection system of claim 1, wherein the instructions to acquire the sensor data further include instructions to acquire the derived perceptions about the sensor data from the vehicle and sampling the sensor data to compress the sensor data for storage.

8. The collection system of claim 1, wherein the offload event is identified and performed from a group including detection of the vehicle within a communication proximity of the edge device and charging of the vehicle at the edge device.

9. A non-transitory computer-readable medium storing instructions for improving offloading and storage of sensor data and that, when executed by one or more processors, cause the one or more processors to:
    responsive to an offload event, acquire sensor data from a vehicle, at an edge device;
    generate, at the edge device, an index of the sensor data according to attributes of how the sensor data was acquired;
    analyze, at the edge device, the sensor data to derive additional content using at least a model;
    update, at the edge device, the index using the additional content to further indicate characteristics of the sensor data relative to the attributes; and
    provide the index to a remote device as a report about contents of the sensor data.

10. The non-transitory computer-readable medium of claim 9, wherein the instructions to analyze the sensor data include instructions to apply, by the edge device, the model to derive perceptions about a surrounding environment of the vehicle represented by the sensor data including a presence of objects, locations of the objects, types of the objects, and relationships between the objects.

11. The non-transitory computer-readable medium of claim 9, wherein the instructions to generate the index include instructions to correlate the sensor data with the attributes about acquisition of the sensor data including at least a time and a location for when respective segments of the sensor data were acquired.

12. The non-transitory computer-readable medium of claim 11, wherein the instructions to update the index include instructions to correlate the additional content with the sensor data in the index according to the time and the location of the respective segments associated with the additional content, and
    wherein the characteristics include content of the sensor data that defines scenarios associated with a combination of objects, locations of the objects, and a roadway context.

13. The non-transitory computer-readable medium of claim 9, wherein the instructions to provide the index include instructions to communicate the index to a cloud-based device to aggregate the index with indexes from other vehicles in order to form a combined catalog of available sensor data among the vehicle and the other vehicles over a broad geographic area.

14. A method, comprising:
responsive to an offload event, acquiring sensor data from a vehicle at an edge device;
generating, at the edge device, an index of the sensor data according to attributes of how the sensor data was acquired, including derived perceptions from automated driving systems and safety control systems of the vehicle;
analyzing, at the edge device, the sensor data to derive additional content using at least a model;
updating, at the edge device, the index using the additional content to further indicate characteristics of the sensor data relative to the attributes; and
providing the index to a remote device as a report about contents of the sensor data.

15. The method of claim 14, wherein analyzing the sensor data includes applying the model, by the edge device, to derive perceptions about a surrounding environment of the vehicle represented by the sensor data including a presence of objects, locations of the objects, types of the objects, and relationships between the objects.

16. The method of claim 14, wherein generating the index includes correlating the sensor data with the attributes about acquisition of the sensor data including at least a time and a location for when respective segments of the sensor data were acquired.

17. The method of claim 16, wherein updating the index includes correlating the additional content with the sensor data in the index according to the time and the location of the respective segments associated with the additional content, and
wherein the characteristics include content of the sensor data that defines scenarios associated with a combination of objects, locations of the objects, and a roadway context.

18. The method of claim 14, wherein providing the index includes communicating the index to a cloud-based device to aggregate the index with indexes from edge devices about other vehicles in order to form a combined catalog of available sensor data among the edge devices over a broad geographic area.

19. The method of claim 14, wherein generating the index according to the attributes includes indexing the sensor data by at least a geographic location of where the sensor data was acquired and a time of when the sensor data was acquired, and
wherein generating the index includes populating the index with the derived perceptions produced by the vehicle associated with safety systems of the vehicle, and automated control systems of the vehicle.

20. The method of claim 14, wherein acquiring the sensor data further includes acquiring derived information about the sensor data from the vehicle and sampling the sensor data to compress the sensor data for storage, and
wherein the offload event is identified and performed from a group including detection of the vehicle within a communication proximity of the edge device and charging of the vehicle at the edge device.

* * * * *